United States Patent [19]
Rischard

[11] Patent Number: 5,863,219
[45] Date of Patent: Jan. 26, 1999

[54] DEVICE FOR FASTENING OF ELECTRIC EQUIPMENT ON AN ADAPTER

[75] Inventor: Karl Rischard, Schafisheim, Germany

[73] Assignee: Allen-Bradley Company, LLC, Milwaukee, Wis.

[21] Appl. No.: 700,901

[22] Filed: Aug. 21, 1996

[30] Foreign Application Priority Data

Sep. 4, 1995 [CH] Switzerland ............................ 02510/95

[51] Int. Cl.⁶ .................................................. H01R 13/60
[52] U.S. Cl. ............................................. 439/532; 439/716
[58] Field of Search .................................... 361/608, 609, 361/627, 725, 726, 727, 807, 809, 679, 600; 211/175, 26; 439/532, 527, 310, 716

[56] References Cited

U.S. PATENT DOCUMENTS 4,878,860  11/1989  Matsuoka ................................. 439/716

FOREIGN PATENT DOCUMENTS

0642197 A1  6/1994  European Pat. Off. .
0762581 A1  6/1996  European Pat. Off. .
  39 22732  10/1990  Germany .
91 07 327.8  11/1992  Germany .

Primary Examiner—Paula Bradley
Assistant Examiner—Tho D. Ta
Attorney, Agent, or Firm—John M. Miller; John J. Horn; William R. Walbrun

[57] ABSTRACT

A device for fastening of electric equipment on an adapter 1 consists of a bearing plate 17 that can be inserted into the adapter 1 and positively locked, and a mounting rail 26 for carrying the electric equipment, with shoe-shaped extensions 27 which can be inserted into the bearing plate 17 and slid into position and locked. The shoe-shaped extensions 27 of the mounting rail 26 engage with the guides 29, 30 of the bearing plate 17. The mounting rail 26 can be slid in the direction of another piece of electric equipment or terminal which is firmly attached, so that the electric terminal parts can be inserted into the terminal clamps of the other equipment. In the operational position, the mounting rail 26 is locked, but can be slid after release of the snap-in locking between the mounting rail 26 and the bearing plate 17. An advantage of this device is that the adapter 1 with the bearing plate 17 can be retrofitted, and that the mounting rail 26 with the equipment can be slid within the bearing plate 17. The established locking in the operating position is effective at least in the direction facing away from the direction of connection, but can be released if necessary.

7 Claims, 5 Drawing Sheets

DEVICE FOR FASTENING OF ELECTRIC EQUIPMENT ON AN ADAPTER

FIELD OF INVENTION

The present invention relates to a device for fastening electric equipment to an adapter. More particularly, the electric equipment is provided with a clamping shoe to secure it on a hat-shaped mounting rail, and the mounting rail can be slid or locked on the adapter, in order to facilitate the connection from the electric equipment to a rigidly mounted electrical connector of the adapter by sliding the equipment-carrying mounting rail in the direction of the connection to the electric equipment.

BACKGROUND OF THE INVENTION

According to DE-C1-3922732, a device for fastening electric equipment on an adapter that is connected to a bus bar and features rigidly arranged terminals on the adapter for the electric equipment is shown. The electric equipment is provided with device terminal clamps and clamping shoes and can be snapped onto a mounting rail that is attached to a spacer block. The spacer block itself can be slid and locked in the adapter guide receptor which is situated perpendicularly to the bus bars. The distance between the terminal contacts which are rigidly mounted on the adapter and the guide receptor is adjusted to the maximum distance between the guide receptor and the equipment terminal clamps. It is achievable to always bring the terminal clamps of devices with different heights on the same level with the rigidly arranged terminal contacts of the adapter by using spacer blocks of different heights, whereby the device terminal clamps can be electrically connected with the terminal contacts by means of sliding the equipment which is snapped onto the spacer block towards the terminal contacts. A disadvantage of this arrangement is that the adapter must be manufactured with a guide receptor, in order to facilitate sliding and repositioning of the spacer block that is provided with a mounting rail. This adapter cannot be retrofitted with a mounting rail that can be slid and locked. Preclusion of retrofitting is also obvious by the fact that the index notches which are required for locking, must be shaped during manufacture of the adapter body itself. Additionally, utilization of the adapter is possible only up to the equipment size that is planned for the adapter, because of the rigidly chosen distance between the guide receptor and the terminal contacts of the adapter. In this arrangement, the equipment terminal clamps must not be positioned higher than the fixed adapter terminal contacts, because otherwise, connection with the equipment terminal clamps by means of sliding the equipment to the terminal contacts is no longer possible. Furthermore, a suitable spacer block must be available for each equipment size. In order to achieve release from the locked status, a locking element is provided between the spacer block and the index notches of the adapter, but it is difficult to access. The lock release status must be maintained during the entire motion of moving the spacer block in the direction for closing the contacts with the electric equipment, as well as during the reverse motion. The spacer block is locked on the adapter in both directions, and is releasable.

Another bus bar adapter is known from DE-U1-9107327. On this bus bar adapter, a plug terminal for the external input and/or output connections is mounted, and is connected to the internal wiring of the electric equipment that is mounted on the adapter. The disadvantage of this arrangement is that the bus bar adapter must be provided during manufacture for mounting of the plug terminal. This adapter can be retrofitted only if the adapter itself features special provisions for the installation of a terminal plug. Furthermore, the terminal plug provided in this arrangement is plugged in longitudinal direction of the bus bar adapter, so that maintenance of a locking system as required for a switching device is no longer possible due to the additional space requirement for the plug. In addition, installation of the terminal plug on the adapter requires a relatively extensive effort.

The task of the present invention is to develop a device of the previously mentioned kind, that can be retrofitted by simple means with a mounting rail that can be slid and is lockable, also used for fastening different sizes of equipment without limitation, and features a locking system that is simple to operate and to release for connecting to the terminals of the equipment attached to the mounting rail.

SUMMARY OF THE INVENTION

The posed task is solved such that a bearing plate is provided which is locked to the adapter in a positively locking connection, which features parallel guides in the sliding direction of the mounting rail and that the mounting rail is provided with shoe-shaped extensions at its lower side and which reach behind the guides of the bearing plate, facilitating sliding of the mounting rail on the bearing plate, such that efficient and releasable locking is provided between the mounting rail and the bearing plate, at least in the direction that faces away from the direction towards the terminals of the connected electrical equipment. The adapter with the bearing plate can easily be retrofitted by snapping in the positively locking connections. As soon as the bearing plate is inserted into the adapter and locked, the matching mounting rail with its shoe-shaped extensions can be installed into the guides behind the bearing plate. Connection of the electrical equipment that is snapped on and locked to the mounting rail, to another piece of equipment or connection point is accomplished after preparation of the connecting leads by sliding and locking of the movable equipment into the desired position where the leads can be attached. The leads of the equipment to be connected can be adjusted at each height of both terminals, measurable above the adapter. Thus, the device is usable for different sizes of equipment. When moving the mounting rail on the bearing plate, advantageously, the releasable locking mechanism between the mounting rail and the bearing plate is not effective in the direction of connecting, but effective in the opposite direction. In order to facilitate moving of the equipment towards its terminal position and at the same time achieve a secure but releasable locking of the equipment in its operating position, locking between the mounting rail and the bearing plate is ineffective in the direction of connecting and effective in the opposite direction but releasable.

A leaf spring type part is positioned in the bearing plate, advantageously aligned with the moving direction of the mounting rail, featuring several index notches with steep flanks essentially perpendicular to the sliding direction—on their sides facing the electrical equipment to be connected, and slanted flanks in the opposite direction; whereby the index notches can engage with at least one latch jut extending from the lower side of the mounting rail into a releasable positive connection. Such latch jut has a steep flank—essentially perpendicular to the sliding direction—on the side facing away from the electrical equipment to be connected. The interaction between the index notches and latch juts with the index notches lined up in direction of the shoe-type extensions of the mounting rail ensures that the electrical equipment can be moved into its contact position with the other equipment by simple sliding; however, opposite motion is blocked. Blockage in the opposing direction is removed when the leaf spring is moved outside the locking path of the latch juts of the mounting part, by holding it down beyond its active area. The operational area of the leaf spring is easily accessible.

The two guides at the bearing plate feature different thickness, and the shoe-shaped extensions of the mounting rail complement different opening widths, so that the mounting rail fits on the bearing plate only in one position. This prevents the mounting rail from being slid on to the bearing plate in a 180° offset wrong position.

A terminal plug carrier part can be attached by means of a positively locked plug connection for mounting of an electrical terminal plug on the bearing plate. The mechanical plug connection of the terminal plug and bearing plate is especially easy to accomplish if a separate terminal plug carrier part is provided that can be inserted into the bearing plate. Likewise, the terminal plug part is connectable to the terminal plug carrier part by means of a plug connection. This results in a particularly simple manipulation of the terminal plug and its interacting components. The electrically conducting connections between the electric equipment and one of the terminal plug parts are made and further, the electrically conducting connections between an external unit and the other terminal plug part. The terminal plug parts are connected by inserting one into the other.

A concrete implementation of the terminal plug carrier part provides that it features a carrier plate with borings, whereby the borings are meant to receive complementary designed latch pins of one of the terminal plug parts. The borings are prepared for the latch pins of simple, off-the-shelf terminal plugs.

The terminal plug carrier part itself suitably features two rod-shaped extensions, parallel to each other, for the insertion into the bearing plate. The length of the extensions are dimensioned such that an adequately exact guide is ensured, especially the tip over secure positioning of the terminal plug carrier part in the bearing plate. To secure this, each protrusion is suitably provided with a recess, which can engage with at least one latch nose of the bearing plate in a positive connection.

BRIEF DESCRIPTION OF THE DRAWINGS

In the following, an example of this invention is described in detail by means of the enclosed drawings. It is shown in.

DESCRIPTION OF THE PREFERRED EMBODIMENT

Figure 1:
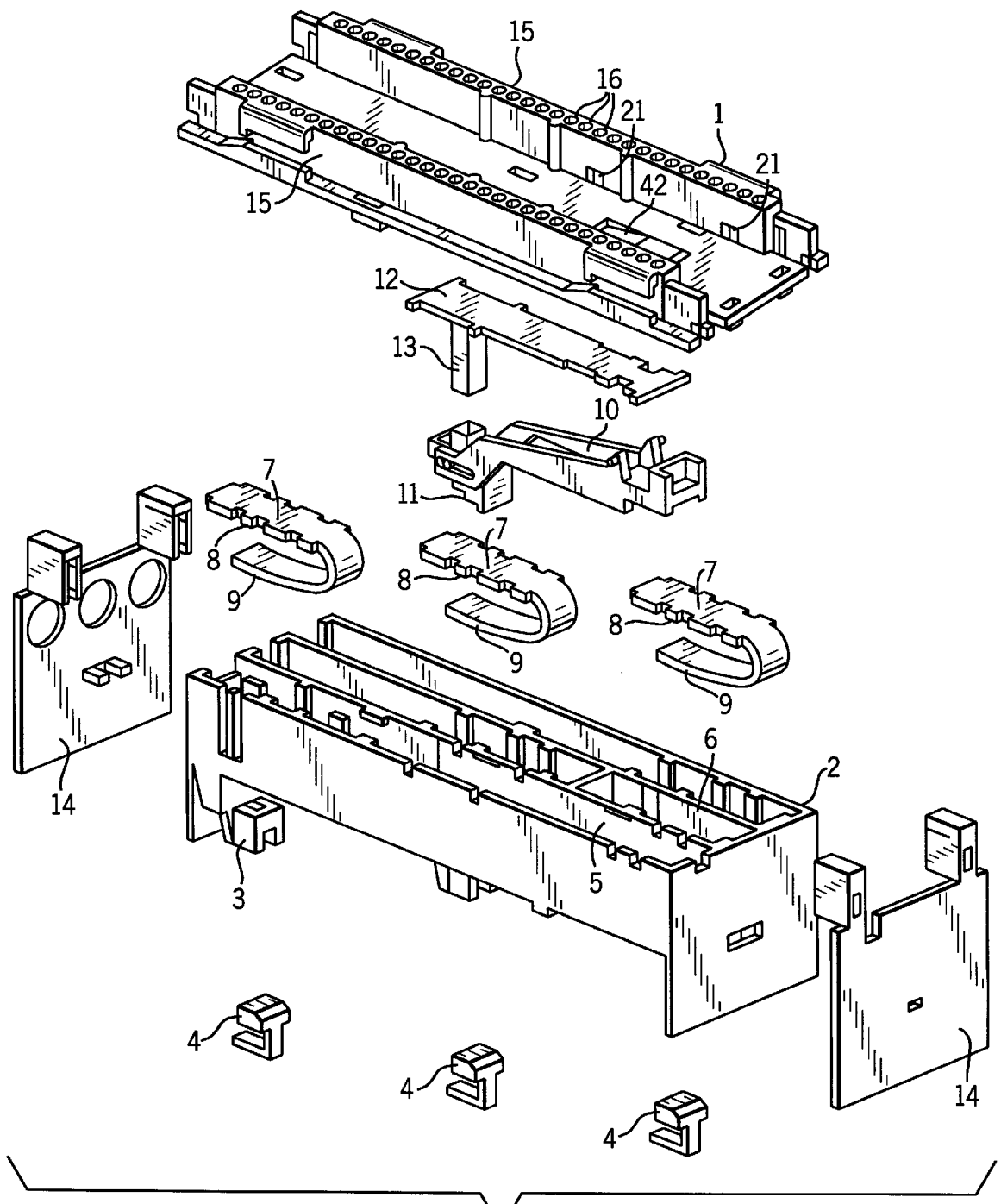
FIG. 1 is an exploded representation of an adapter in accordance with is preferred embodiment of the present invention.

FIG. 1 illustrates the basic assembly of an adapter, whereby in these representations, those parts that relate to the bearing plate, the mounting rail, and the terminal plug carrier part are omitted.

FIG. 1 makes clear that the entire arrangement is made of plastics, except for those parts required for conducting current, and provides a box-shaped adapter base 2 and an essentially flat-shaped designed adapter 1. The adapter base 2 is provided with three contact feet 3 at its lower side, of which only one is visible, The contact feet 3 reach behind three bus bars not shown which are positioned perpendicular to the longer side of the adapter 1 in known fashion. To facilitate utilization of the adapter base 2 with bus bars of various thickness, spacer pieces 4 are provided which can be mounted onto the contact feet 3. The adapter base 2 features two separation struts 5 and 6, dividing the adapter base 2 into three longitudinal chambers. A contact spring 7 is inserted in each chamber, held by its profiled contour 8 in the adapter base 2. The other, non-profiled leg 9 of each contact spring 7 rests against its corresponding bus bar when the adapter base 2 is mounted on the bus bar. A plug connector can be pushed on the free end of the profiled part 8 of each contact spring 7, which is connected to an electric wire that leads to a piece of electric equipment. Those previously mentioned electrical components are not shown. Finally, an operating lever 10, housing a staircase-shaped latch part 11, is located in the middle chamber of the adapter base 2. A cover plate 12, located between both separator struts 5 and 6, covers the operating lever 10 and is equipped with a guide post 13 which penetrates the latch part 11, thus providing guidance. The staircase-shaped allows the center bus bar to be centrally located between the latch part 11 between itself and the corresponding contact foot 3, whereby the distance of the stairs of latch part 11 are adjusted to possible bus bar widths. A spring that is pressing the latch part into direction of the bus bar is not shown. The adapter 1 is mounted onto the completed adapter base 2 and locked in this position with the adapter base 2. In order to prevent unintentionally touching of the voltage loaded bus bars, a plate-shaped safety guard 14 is provided in the area of each front side of the adapter base 2, attachable to the adapter base 2 and the adapter 1. At its longer sides, the adapter 1 features two parallel struts 15 adjacent to the edges, with rows of holes, whereby the individual holes are identified with reference number 16.

Figure 2:
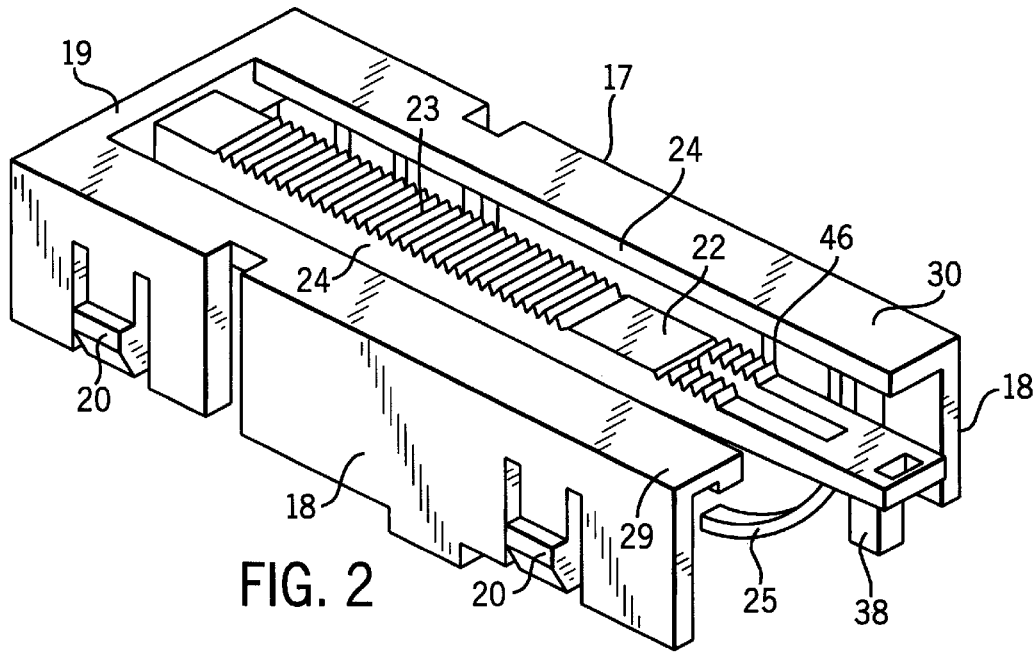
FIG. 2 is a perspective view of a bearing plate in accordance with the preferred embodiment of the present invention.

A bearing plate 17 can be seen in FIG. 2. The block-shape designed bearing plate 17 features side walls 18 as well as a cover plate 19, connecting those. The width of the bearing plate 17 corresponds to the distance between the two struts 15 of the adapter 1 and its side profile corresponds to the side profile of the struts 17 in the insertion area of the bearing plate 17. The bearing plate 17 is mounted on the adapter 1 from the top, as indicated by the arrow A in FIG. 5, whereby latch noses 20, provided on both sides of the bearing plate 17, engage in the latch recesses 21 of the struts 15. Due to this locked connection and the profiled shape of the bearing plate 17 and the struts 15, the bearing plate 17 is firmly joined with the adapter 1. The U-shaped cover plate 19 of the bearing plate 17 houses a leaf spring type part 22 in the area of its connecting strut in the longitudinal direction of the adapter 1, featuring a large number of perpendicular index notches 23 on the side facing away from the adapter 1. On its sides facing the direction of connecting the electric equipment, the index notches 23 feature steep, essentially perpendicular flanks towards the moving direction of the mounting rail 26, and slanted flanks in the opposite direction. This arrangement facilitates the unimpeded sliding of the bearing plate with the electric equipment in the direction of connection(direction B in FIG. 5), and its locking in the opposite direction, whereby the locking is releasable. The width of the leaf spring type element 22 is dimensioned such that a cleavage 24 remains on both sides of this element to the cover plate 19, whereby both cleavages 24 run parallel to the longer side of the bearing plate 17. The leaf spring type element 22 is held in the engaged position with the index notches 23 by a spring 25. The stop 38 prevents an excessive bending of the leaf spring type element 22.

Figure 3:
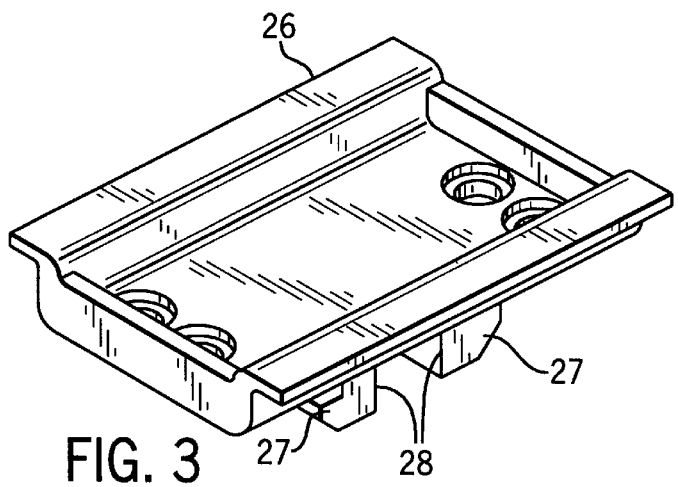
FIG. 3 is a perspective view of a mounting rail in accordance with the preferred embodiment of the present invention.
Figure 4:
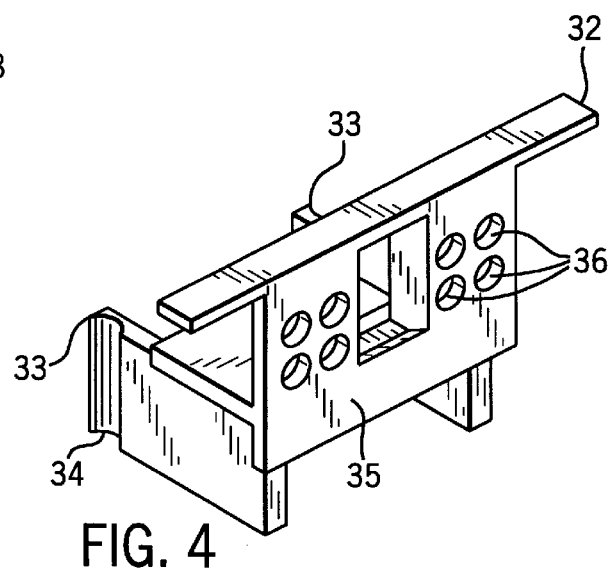
FIG. 4 is a perspective view of a terminal plug carrier part in accordance with the preferred embodiment of the present invention.
Figure 7:
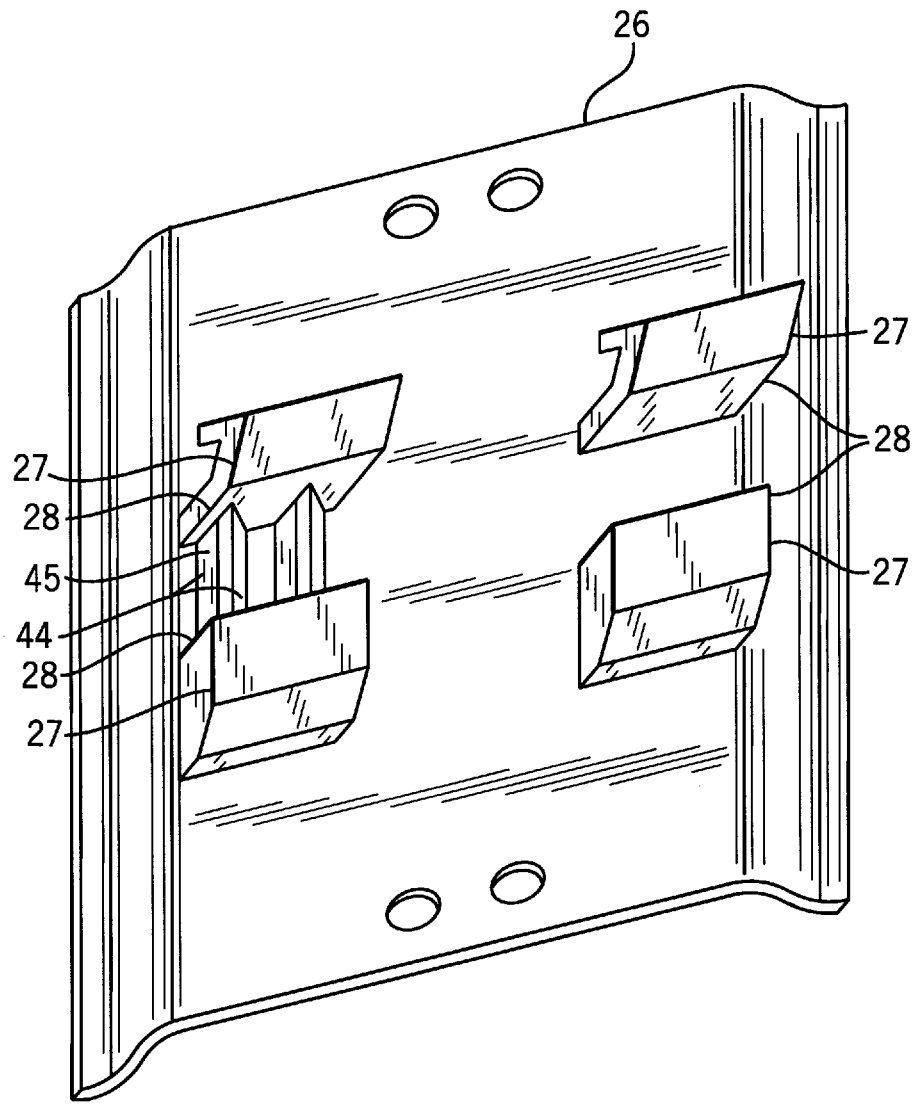
FIG. 7 is a perspective view of the mounting rail of FIG. 3 in accordance with the preferred embodiment of the present invention.

The bearing plate 17 is housing the movable mounting rail 26 shown in FIG. 3, with four shoe-shaped extensions 27 at its lower side. Only the two front extensions 27 are visible, as the two rear ones are hidden by the mounting rail 26. Assembly of the mounting rail 26 is accomplished by inserting it into the open end of the bearing plate 17 in the direction as indicated by arrow B in FIG. 5, whereby the legs 28 of the shoe-shaped extensions 27 penetrate the cleavage 24 between the cover plate parts 29 and 30, thus engaging the shoe-shaped extensions 27 around the cover plate parts 29 and 30 without play. The cover plate parts 29 and 30 are of different thickness and the shoe-shaped extensions 27 feature complementary different openings, so that the mounting rail 26 fits on the bearing plate 17 in only one position. Reverse insertion of the mounting rail 26 by 180° on the bearing plate 17 is made impossible by this measure. FIG. 7 shows latch juts 45 which are arranged on that side of the mounting rail 26 which is facing the bearing plate 17, which in a comb-like manner engage with the index notches 23 of the leaf spring type part 22. These latch juts 45 feature steep flanks 44, essentially perpendicular on both latch-efficient sides, in the direction of motion of the mounting rail 26. The index notches 23 of the leaf spring type part 22 are shaped such that moving the mounting rail 26 in the direction of the firmly fastened mounting rail 31 on the adapter 1 (direction B in FIG 5) is possible, but moving of the mounting rail 26 in the opposite direction is not 26. To make this possible nevertheless, the leaf spring type part 22 must be moved down in the area of its free end against the force of the spring 25, whereby the index notches 23 disengage from the latch juts 45 of the mounting rail 26. The mounting rail 26 is connected with some electric equipment, for example a contactor. By carrying the mounting rail 26 in bearing plate 17, the electric equipment mounted on this mounting rail 26 can be connected—electrically conducting—by simple means and fashion with the other electric equipment that was previously mounted and firmly secured on mounting rail 31, by sliding it together with the mounting rail 26 on the bearing plate 17 until the contact pins of this equipment plug into matching contact openings of the other equipment that is firmly mounted on mounting rail 31. Both pieces of equipment are thus permanently locked and connected, electrically conducting.

The bearing plate 17 can accommodate a terminal plug in the area of its end facing the adapter 1. For this, a terminal plug carrier part 32 is provided with two rod-shaped extensions 33 parallel to each other whose outer guide distance corresponds to the distance of both side walls 18 of the bearing plate 17, and the height of each extension 33 corresponds to the opening distance under the cover plate portion 29 and 30 respectively in the bearing plate 17. In order to firmly secure the terminal plug carrier part 32 when sliding it into the bearing plate 17, each extension 33 features a latch recess 34 which engages with a latch jut 46. The off-the-shelf terminal plug not shown is held by a plug connection in the terminal plug carrier part 32 mounted in bearing plate 17. For this, the terminal plug carrier part 32 features a carrier plate 35, connected with the two extensions 33, and is provided with borings 36. The terminal plug part is provided with multiple latch pins, designed complementary to the borings 36. The terminal plug part can easily be held by plugging it onto the carrier plate 35. The figures do not show the electric wiring from the electric equipment fastened to the mounting rail 26 to the terminal plug part, and the cables leading from its counterpart to an external output.

Figure 5:
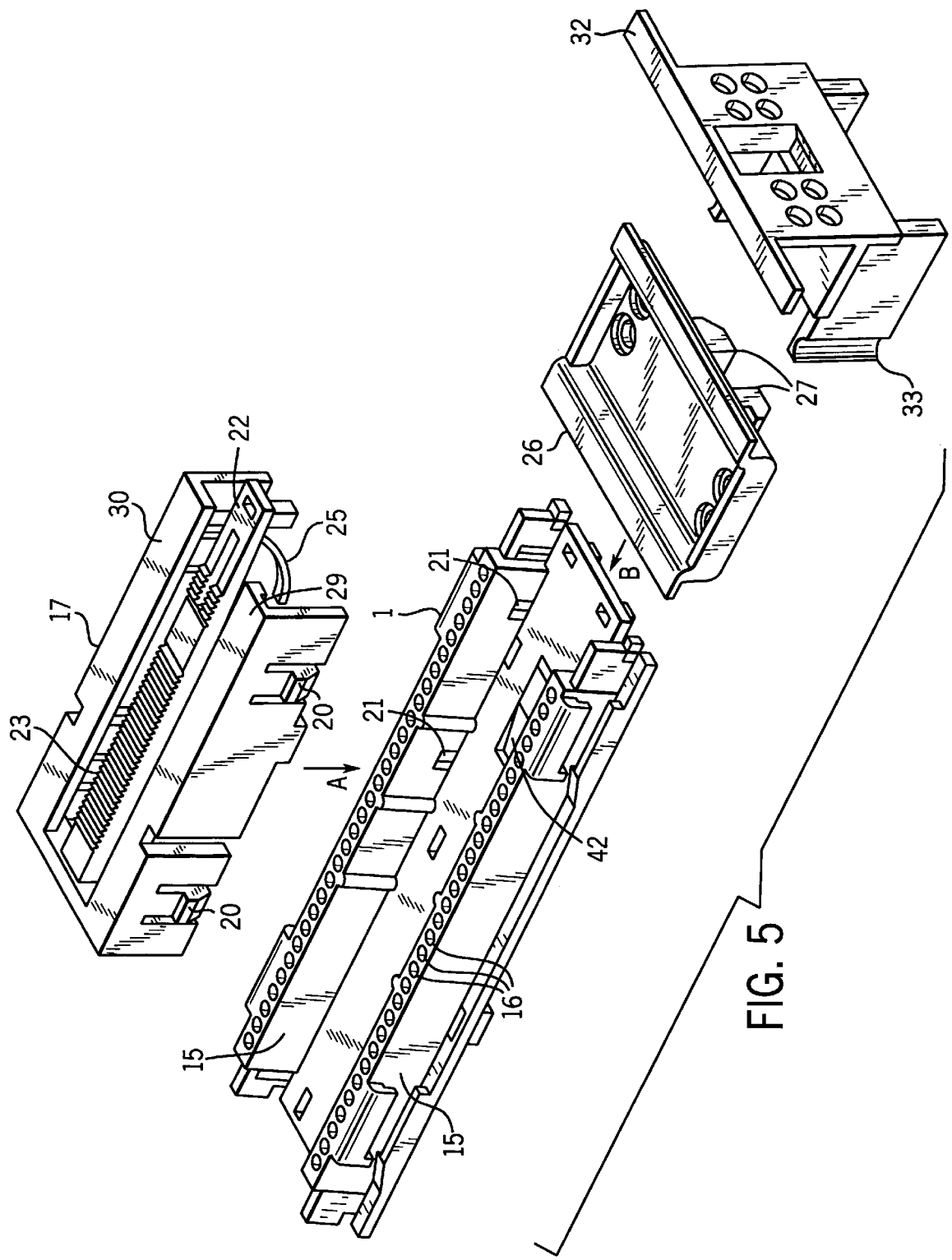
FIG. 5 is an exploded representation of certain adapter parts shown in FIGS. 1 through 4 in accordance with the preferred embodiment of the present invention.

FIG. 5 clearly illustrates, as previously described, how the bearing plate 17 is inserted into the adapter 1 in the direction of arrow A. On an installed bearing plate 17, the latch juts 20, part of the shape of bearing plate 17 engage with the recessed areas 21 of the adapter 1. The mounting rail 26 is slid into the installed bearing plate 17, in the direction of arrow B, until the index notches 23 of the leaf spring type part 22 engage with the latch juts 45 under the bottom of the mounting rail 26. The bent spring 25 stays at the bottom of adapter 1 and ensures with pressure that the index notches 23 remain engaged with the latch juts 45 of the mounting rail 26. The terminal plug carrier part 32 is subsequently slid into the bearing plate 17 in the direction of arrow B, where it locks in place.

Figure 6:
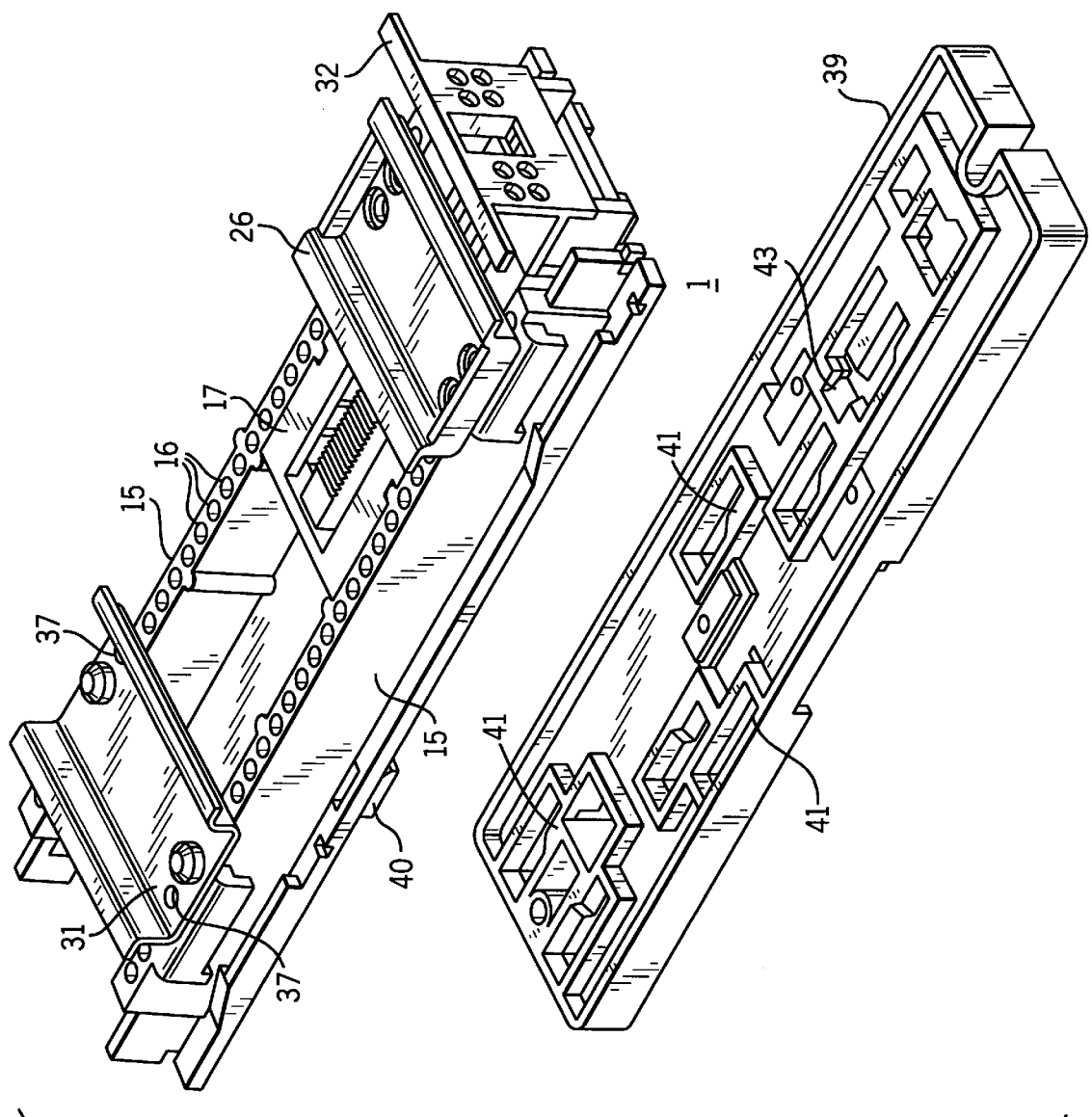
FIG. 6 is a perspective view of the adapter with inserted bearing plate, with mounting rail and with terminal plug carrier part as well as an adapter lower part for wall mounting.

FIG. 6 shows the adapter 1 with installed bearing plate 17 and firmly screwed on mounting rail 31. The mounting rail 31 is connected over both struts 15 in the area of one end of those struts 15. The mounting rail 31 features a hat-shaped profile and is about as long as the adapter 1 is wide. The mounting rail 31 features four borings 37 in its center area, whereby two borings 37 each are associated with a row of holes, so that fastening of the mounting rail 31 on the adapter 1 can basically take place at any chosen position with four screws in corresponding holes 16 of the row of holes. The screws self-tap into their holes 16 of the row of holes. The mounting rail 31 serves for carrying electric equipment not shown, for example a contactor, power switch, etc. The electric equipment to be installed features at its bottom a snap shoe, shaped complementary to the profile of the mounting rail 31. If required for wall mounting, the complete adapter 1 is slid onto an adapter base 39 as shown in the lower half of FIG. 6, and is locked in its slid-on end position. When sliding the adapter 1 onto the adapter base 39, the fastening shoes 40, of which only one is visible in FIG. 6, engage with the latch juts 41 shaped at the bottom of the adapter base 39. Locking of the adapter 1 onto the adapter base 39 in the slid-on end position is accomplished by the spring tongue 42 visible in FIGS. 1 and 5, which engages with the center wall 43 of the adapter base 39.

I claim:

1. A device for fastening electric equipment on an adapter, said device comprising:

a releasable unidirectional locking element;

a hat shaped mounting rail for carrying the electric equipment, said mounting rail comprising shoe shaped extensions and at least one latch jut, the mounting rail defining an elongated axis; and a bearing plate comprising parallel guides arranged parallel to the elongated axis, the parallel guides arranged to engage the shoe-shaped extensions;

wherein, in use, the at least one latch jut and the shoe shaped extensions in conjunction with said releasable unidirectional locking element facilitate sliding of the mounting rail on the bearing plate in a first direction parallel to said elongated axis and preclude sliding of the mounting rail on the bearing plate in a second, opposite direction.

2. The device according to claim 1, wherein a leaf spring type element is positioned in the bearing plate and aligned parallel to the elongate axis of the mounting rail, the leaf spring element comprising several index notches featuring steep flanks facing the first direction and slanted flanks in the second direction, whereby the index notches can be brought into a releasable positive connection with the at least one latch jut, the latch jut featuring a steep flank facing away from the first direction.

3. The device according to claim 1, wherein the guides feature a different thickness, and the shoe-shaped extensions of the mounting rail have complementary opening widths, so that the mounting rail fits on the bearing plate in only one position.

4. The device according to claim 1 further comprising a terminal plug carrier element attachable to the bearing plate to form a positively locked plug connection for mounting an electric terminal plug.

5. The device according to claim 4, wherein the terminal plug carrier element comprises a carrier plate defining borings whereby the borings permit reception of at least one complementary designed plunger pin of the terminal plug part.

6. The device according to claim 4 wherein the terminal plug carrier element further comprises two rod-shaped extensions arranged parallel to each other, for sliding the terminal plug carrier element onto the bearing plate.

7. The device according to claim 6, wherein each of said rod shaped extensions feature a recess which can be brought into a positively locked connection with at least one latch jut of the bearing plate.

* * * * *